US008452696B1

(12) United States Patent
Morean et al.

(10) Patent No.: US 8,452,696 B1
(45) Date of Patent: May 28, 2013

(54) METHOD AND SYSTEM FOR THE AUTOMATION OF ABATEMENT OF FINE RECOVERY

(75) Inventors: William Donald Morean, Red Lodge, MT (US); Christopher Jae Heinberg, Tampa, FL (US); Harvey Emory Stringer, Jr., Jacksonville, FL (US)

(73) Assignee: Association Capital Resources, LLC, Jacksonville, FL (US)

( * ) Notice: Subject to any disclaimer, the term of this patent is extended or adjusted under 35 U.S.C. 154(b) by 0 days.

(21) Appl. No.: 13/540,206

(22) Filed: Jul. 2, 2012

(51) Int. Cl.
 *G06Q 40/00* (2012.01)
 *G06Q 40/04* (2006.01)
(52) U.S. Cl.
 CPC ............... *G06Q 40/00* (2013.01); *G06Q 40/04* (2013.01)
 USPC .......................................................... 705/37
(58) Field of Classification Search
 CPC .................................................... G06Q 40/00
 USPC ...................................................... 705/35–44
 See application file for complete search history.

(56) References Cited

U.S. PATENT DOCUMENTS

| | | | | |
|---|---|---|---|---|
| 2005/0197947 | A1* | 9/2005 | Tyson | 705/36 |
| 2006/0282356 | A1* | 12/2006 | Andres et al. | 705/35 |
| 2008/0281648 | A1* | 11/2008 | Morris | 705/7 |
| 2011/0302076 | A1* | 12/2011 | Livermore et al. | 705/38 |

* cited by examiner

*Primary Examiner* — Olabode Akintola
(74) *Attorney, Agent, or Firm* — Foley & Lardner LLP

(57) ABSTRACT

Municipalities, local authorities and agencies fine property owners for property infractions each year. When these property fines are not collected, they are turned into a lien assessed against the property, which is superior to other liens, title, and claims until paid. These liens are assessed for violations and accumulated on the real estate title. In many cases these liens are never collected, resulting in the loss of revenue to municipalities, local authorities and agencies. The described methodology is a process to improve on the collectability of these liens. Information is analyzed and categorized according to probability of collection. Once the system determines the value of the special assessment lien, upfront funding can be offered to the municipalities, local authorities and agencies. The system manages the debtor information and communications in order for the municipalities, local authorities and agencies to track collection efforts that contribute to the recovery of lost revenues.

20 Claims, 3 Drawing Sheets

METHOD AND SYSTEM FOR THE AUTOMATION OF ABATEMENT OF FINE RECOVERY

BACKGROUND

Every year in the United States, countless property abatement fines are uncollected by municipalities, local authorities and agencies. As a result, almost every municipality, local authority, and agency has delinquent abatement fine receivables. These fines of residential, commercial, or other nature, are not always detected during title search or escrow closing during the sale refinance or transfer of real property. After such closings, all liens against the subject property are settled. Specifically, lienholders against such subject property are paid and title is thus cleared as the subject property, at which time the property is now refinanced or transferred. With respect to property abatement liens, be they municipalities, local authorities and agencies, or any combination thereof, if such a lien existed against the subject property or its owner of record, said lien would of course be satisfied at subject close of escrow, resulting in the municipalities, local authorities and agencies recovering liens as appropriate.

From a fine recovery perspective, a very real shortcoming exists with the above process, which is and continues to be standard procedure in the municipalities, local authorities and agencies with respect to real property transactions of a residential, commercial or other nature. For example, the current process omits entirely a very substantial property fine recovery mechanism which could assist municipalities, local authorities and agencies revenue recovery efforts, or any combination thereof, in situations where liens exist not against the property in escrow or its owner, but rather against the lienholder on the subject property. Specifically, there are indeed instances involving real property transactions where municipalities, local authorities and agencies or any combination thereof, are due abatement fine fees by certain parties who are other than the property owner of record. These outstanding obligations are in fact currently undetectable, and therefore uncollectable, to said municipalities, local authorities and agencies as a result of said real property being owned by another party, which third party has no real property ownership relationship, such as a community property interest, a joint tenancy interest, a tenancy in common interest, or any other ownership interest with the party who in fact owes such outstanding fines.

SUMMARY

In general, one aspect of the subject matter described in this specification can be embodied in methods for a lien collection process that ranks the superiority value of liens to determine the enforcement and collectability by prioritizing municipalities', local authorities' and agencies' abatement liens or other types of property liens with the use of a cloud-based computer application. Other implementations of this aspect include corresponding systems, apparatuses, and computer-readable media configured to perform the actions of the methods.

The system described solves issues associated with collection of abatement property fines and cash flow for municipalities, local authorities, and agencies while not presenting any significant increase in expenditure on behalf of municipalities, local authorities and agencies.

In other aspects, the described embodiments include a method for providing revenue from delinquent fines while including a procedure for prioritizing and selecting a period of time for collection. The described embodiments also determine a payment price for the right to ownership to collect on said fines. A delinquent fine purchase price for the right to collect on the portfolio of delinquent fines is determined, and is preferably less than or equal to the present value of the portfolio of delinquent fines assessed.

Under the program, a buyer, according to a purchase contract or assignment contract, agrees to purchase the right to collect the delinquent fines periodically from the municipalities, local authorities and agencies based on a formula. The purchase contract is inclusive and binding between the buyer and the municipalities, local authorities, and agencies to transfer ownership of the portfolio of abatement fines in order to permit the buyer to start its collection process. The formula provides maximum annual revenue based upon the collectability of the debtor. Vital components of the formula are gathered through statistical analysis of the lien and property owner.

The statistical analysis involves evaluation of historical collection variables during the respective collection period. Variables include: a.) historical total principal collected for previously delinquent debt, b.) historical monthly (or other agreed upon interval) collection amounts of previously delinquent accounts, and c.) historical collection amounts on penalties (interest) or adjustments to previously delinquent accounts. Due to risks associated with the tracking and recovery of abatement fines assessed on property owners, the formula provides an estimated value of the debt in order for it to be considered for collections. Therefore, a previously purchased lien average does not assure that future liens will be purchased at the same collection rate.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 3 illustrates a browser-based user interface showing a data display and input screen for lien information according to an illustrative embodiment.

FIG. 4 illustrates a browser-based user interface showing a data display and input screen for property owner information according to an illustrative embodiment.

Figure 1:
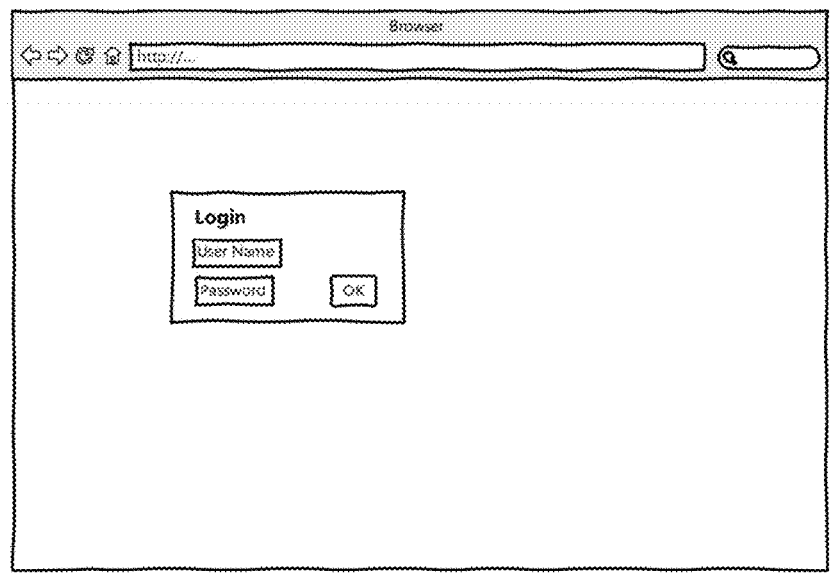
FIG. 1 illustrates a browser-based user interface showing a log-in screen according to an illustrative embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

FIG. 1 illustrates a log-in screen for a system for the automation of abatement of fine recovery. In an example embodiment, the system operates as a server side application installed on a cloud-based computing environment. Cloud computing refers to the delivery of computing and storage capacity as a service to a community of end-recipients. Cloud computing entrusts services with a user's data, software and computation over a network. Users access cloud computing using networked client devices, such as a desktop computer, laptop, tablets, and smartphones, while the business software and data are stored on servers at a remote location.

All network traffic between a workstation and the server occurs in the example embodiment through HTTPs as the transmission protocol to meet Personal Card Industry (PCI) compliance as well as other government security requirements. The cloud environment is designed for high-availability of network traffic, redundancy and maximum flexibility. The system is scalable and can accommodate the complex tasks and fluctuations of the business process. Many cloud applications do not require specific software on the client side computer and instead use a web browser to interact with the cloud application. Cloud computing relies on sharing of resources to achieve coherence and economies of scale similar to a utility over a network (typically the Internet). The system offers municipalities, local authorities and agencies numerous benefits. Municipalities, local authorities and agencies are not required to make further investments in hardware devices or software products. Accessibility for any agency is available through the internet. Users may contact customer support system engineers at any time for questions regarding the usage of the system.

Figure 2:
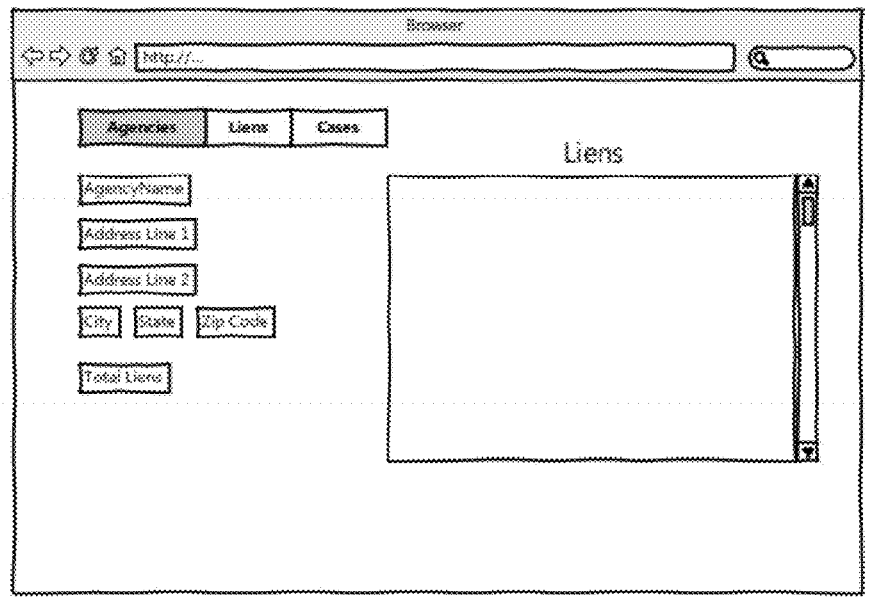
FIG. 2 illustrates a browser-based user interface showing a data input screen according to an illustrative embodiment.
Figures 3, 4:
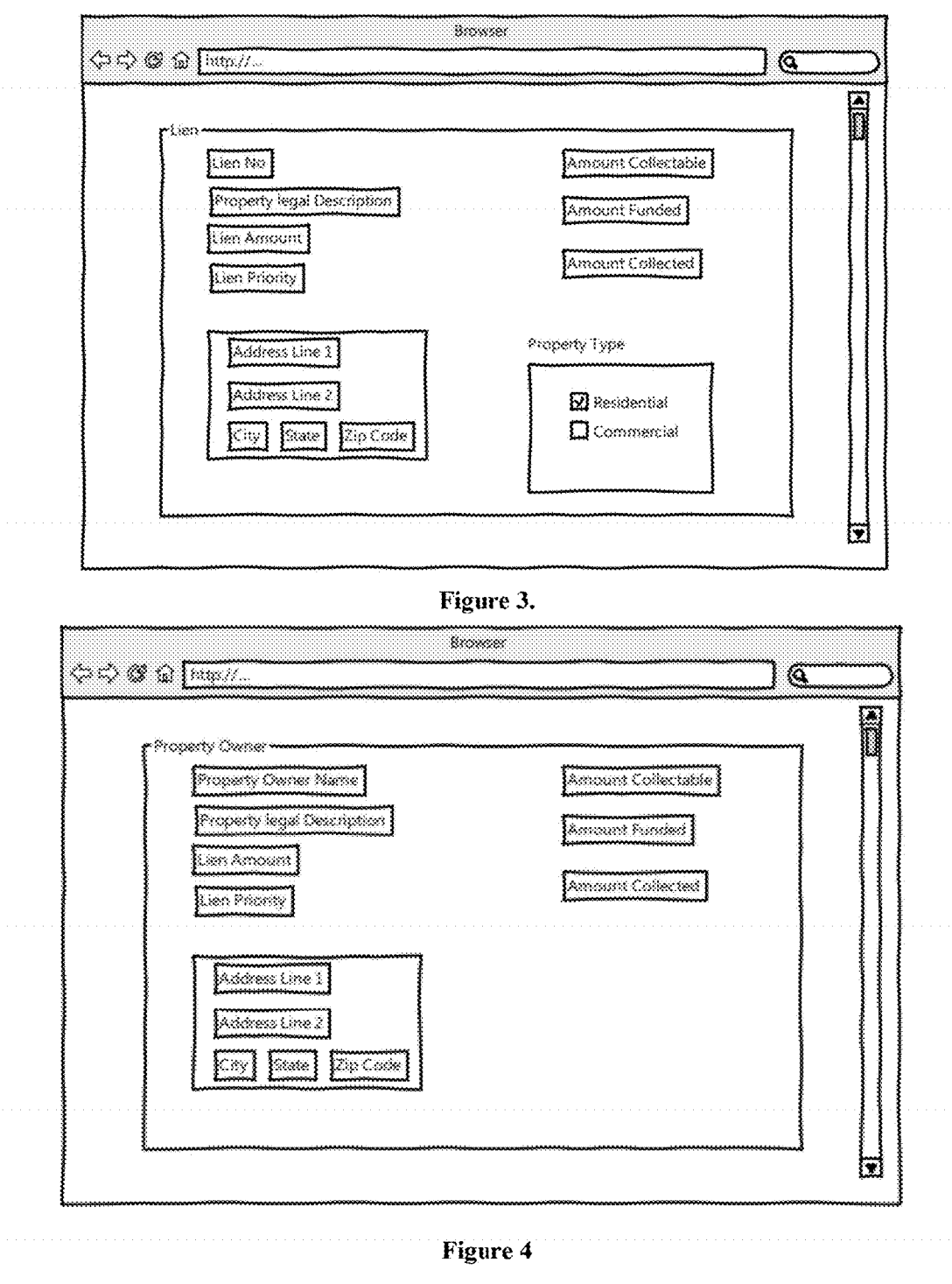

FIG. 2 illustrates a browser-based user interface showing a data input screen. FIG. 3 illustrates a browser-based user interface showing a data display and input screen for lien information. FIG. 4 illustrates a browser-based user interface showing a data display and input screen for property owner information.

Figure 5:
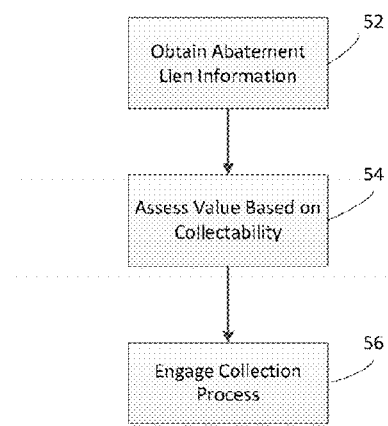
FIG. 5 illustrates a work flow process diagram depicting operations performed according to an illustrative embodiment.

FIG. 5 illustrates a work flow process diagram depicting operations performed in an example embodiment. Additional, fewer or different operations may be performed depending on the particular embodiment. In an operation 52, lien information is obtained. The example system is designed for municipalities, local authorities and agencies to provide lien information through an automated process. To begin the process, the municipalities, local authorities and agencies select from several options in order to enter the property abatement fine information using the system's browser-based webpage, or by importing the information using a comma separated value (.csv) file, or create a Search through public records. The system complies with industry standard security protocols such as SMTP and HTTPS to ensure encryption and security of data collected. For a proper submission, the system requires all pertinent lien information of the debtor; the information required will include and is not limited to:

1. Lien Number—key identifier
2. Property address—actual property location
3. Legal description—Commercial, residential
4. Parcel number—Lot, block number
5. Property owner name—entity name
6. Business or individual—Commercial, residential
7. Fine amount—Lien
8. Date fined—start and expiration date
9. Fine type or violation—description of fine
10. Interest—accrued as allotted by state/local statutes
11. Municipality, local authorities, agencies name
12. OR Book and Page Number
13. Lien PDF attachment All the data collected will be stored in a relational (SQL) database. The system provides the capability to search through public municipalities, local authorities and agencies sites and copy abatement lien information as a method to reduce the effort of data entry.

All personal identifiable information is stored within encrypted databases to protect the information from security breaches. Encryption does not solve access control problems. However, it enhances security by limiting data loss even if access controls are bypassed. For example, if the database host computer is misconfigured and a hacker obtains sensitive data, that stolen information would be rendered useless due to encryption.

The database design can consist of tables, each table will be normalized and include a primary unique index. Tables and database structures being considered but not limited are:

1. Agency/Municipality—this table includes the following columns: Unique Key, Agency Name, Address Line 1, Address Line 2, City, State, Zip Code, County, and Total Liens.
2. Lien table—this table includes the following columns: Unique Key, Lien No, Lien Amount, Property Key, Agency Key, Lien Priority, Amount Collectable, Amount Collected, and Amount Funded. The Lien table is linked to the Agency table and the Property Table using referential integrity.
3. Property table—this table includes the following columns: Unique ID, Property Legal Description 1, Legal Description 2, Lien Key, Property Address Line 1, Property Address Line 2, City, State, Zip Code, County, and Owner Key. The Property table is linked with the Line Table and the Property Owner table using referential integrity.
4. Property Owner table—this table includes the following columns: Unique ID, Owner Name, Owner Type (business or person), Property Key, and Lien Key. The Property Owner table is linked to the Lien Table using referential integrity.
5. Users table—this table includes the following columns: Unique ID, username, password, email, group key, initials, and active flag. The Users table is linked to the group table using referential integrity.
6. Group Table—this table includes a group key, group name.
7. Attorney table—this table includes the following columns: Unique key, attorney name, It's related to the Lien table using referential integrity.
8. Court table—this table includes the following columns: this table consists of the following columns: Unique key, Court name.
9. System Parameters—stores configuration parameters.

In an operation 54, the value of the lien is assessed based on collectability. Upon completion of the entry of the abatement lien information by the municipalities, local authorities and agencies into the system, a buyer begins its value assessment to evaluate the true collectability and value of a debt including interest allowable per local state/local statute. The buyer can identify and prioritize the lien based on the superiority of the lien versus other property encumbrances. To determine the probability of the collectability of the debt, the buyer can use a scale system of 0 to 100 to score the debtor. The scoring will determine the funding provided to the municipalities, local authorities and agencies, as well as a system to focus on debtors with a higher probability score. The buyer can also assist the municipalities, local authorities and agencies by providing a portfolio report with those abatement liens that were not properly recorded. Upon completion of this phase, the buyer can then offer the municipalities, local authorities and agencies capital for the right to collect on the portfolio of delinquent debt. The funding amount is determined using a mathematical formula based on the debtor's credit worthiness, assets, and value of property. Once the agreement to transfer the delinquent lien amount is contracted with the municipalities, local authorities and agencies, the buyer can complete the transaction by transferring the funding and initiate its collection process.

To determine a score within a scale system, the buyer can use proprietary algorithms utilizing statistical and decision models to rank the liens within the portfolio; the ranking will prioritize the liens based on percentage of probability to collect as well as amount collectable (lien priority). The scoring system can consist of: Ranking score (e.g., Highly Collectable, Collectable, Not Collectable), Funding amount, Amount collectable, Purpose, Indexing capabilities, Statistical analysis of lien/property owner (e.g., Municipal/lien position, Lien type, Property value, Loan to value ratio, Assets analysis of the property owner, Credit status of the property owner, Property type (business, primary residence, investment property), Lien date, Property age, Property appraisal, Bankruptcy search, Property title search/lien priority.)

In an operation 56, a collection process is engaged. The collection process can be managed through a web site that records notes, letters and all communications between the debtor and the agency. The system automates the generation of letters, notes and tasks. The system provides management reports and alerts of actions that need to be taken. This information will be provided to the municipalities, local authorities and agencies at their convenience. The buyer documents the collection effort utilizing the system. The system allows for the municipalities, local authorities and agencies to track the effort on their individual cases. The system also provides a PCI compliant point-of-sale (POS) system for debtors to pay their outstanding debt. The system provides a mechanism for tracking and documenting other charges that may be added through the collection process.

To inform the municipalities, local authorities and agencies regarding abatement liens not properly filed, the buyer's process can clean the entered data. Fields such as property owner, address, and legal name will be verified to ensure proper filing. To expedite the management of the collections process, the system can provide the following tools:

- Data entry fields for the recording collections efforts;
- Automated letters sent to debtors;
- Call management, to manage employee collection efforts when trying to collect on the debt;
- Task management functions, to help manage the timed and untimed events that occur during the collections process;
- Management reports to determine the success of the collection process;
- Track issue and notification of public record with debtors paying the municipalities, local authorities and agencies that ACR holds the debt; and
- PCI compliant POS to enable debtors to submit payments for outstanding abatement fines.

Figure 6:
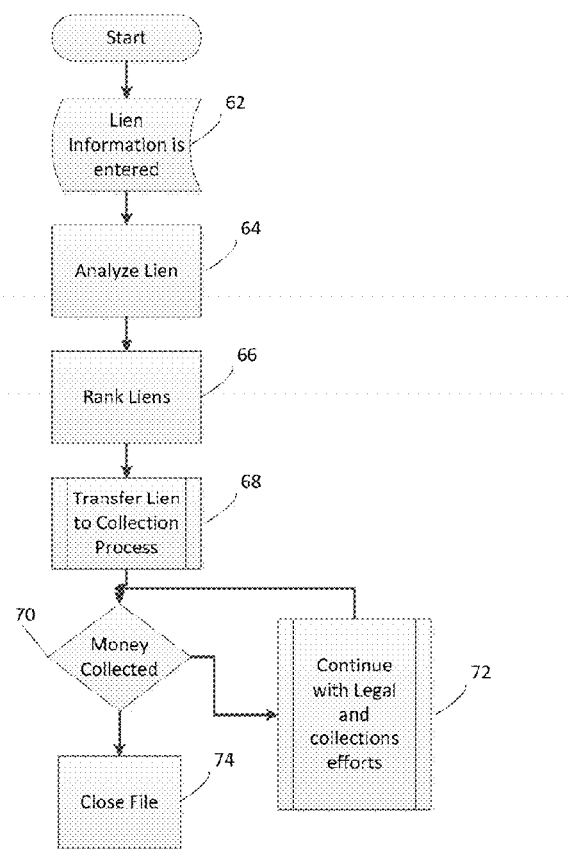
FIG. 6 illustrates a work flow process diagram depicting operations performed according to an illustrative embodiment.

FIG. 6 illustrates a work flow process diagram depicting operations performed in an example embodiment. Additional, fewer or different operations may be performed depending on the particular embodiment. In an operation 62, lien information is entered. The lien data is entered by the agency or by the collection underwriter. The information can be gathered from different credit bureaus as well as government information databases. The data may be analyzed and entered by the collection underwriter. In operation 64, the lien is analyzed, as discussed with reference to FIG. 5, and in an operation 66, the liens are ranked. Using the information gathered in operation 64, each lien is ranked on probability to collect. In an example embodiment, the ranking groups liens in 4 categories: highly probable to collect liens are classified as A, likely probable to collect lines are classified as B, collectable liens are classified as C and uncollectable liens are classified as D or F. In an operation 68, the lien is transferred to collections in operations 70 and 72. Once the money for the lien is collected, the file is closed in operation 74.

Among the many advantages of the system and method described is the prioritization of liens as well as the improved efficiency of collecting liens. Utilizing computer systems and statistical models, an optimized collection process improves the amount collected on behalf of municipalities, local authorities, and agencies. It also provides mechanisms to assure that liens are properly recorded and enforced. By doing the upfront analysis on each debtor, it gives municipalities, local authorities, and agencies the ability to receive funds for debt that is currently languishing uncollected.

Heretofore, municipalities, local authorities, and agencies currently have not had the resources or personnel to expedite the discovery process of their current delinquent lien files and the collectability of the liens. Municipalities, local authorities and agencies do not function as collection agencies as their primary business, therefore they need the benefit of a system that can track, evaluate and increase collectability of outstanding property abatement fines. The systems and methods described herein make it possible to identify valid and expired liens as well as increased collections using its methodology. Once expired liens are identified, a buyer can work with the municipalities, local authorities and agencies to re-file and start collection processes against the debtor.

Increasing capital for the municipalities, local authorities, and agencies is a primary incentive to provide the buyer with abatement lien information. The funding provided by the buyer to the municipalities, local authorities and agencies for the data entry information will increase revenues while providing the buyer with the ability to implement its collection process to collect on negligent debt.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   obtaining abatement lien information for a lien on a property via a computer network, wherein abatement lien information comprises property information for the property including information on other property encumbrances associated with the property;
   determining via a computer processor a value of the lien based on lien collectability, wherein the value of the lien is based at least in part on a determination of a priority of the lien compared to other property encumbrances of the property, and wherein the value of the lien is further based at least in part on a comparison of the lien to other municipality and agency abatement liens for other properties; and
   engaging a collection process for the lien, wherein the collection process includes making automatic communications to a debtor, tracking collection efforts, and collecting payments for the lien.

2. The method of claim 1, further comprising determining via the computer processor a purchase value for the lien, wherein the purchase value includes a price at which a buyer purchases the lien.

3. The method of claim 2, wherein the purchase value is based on a collectability factor and a profit margin for the buyer.

4. The method of claim 1, wherein determining the value of the lien comprises calculating value based on debtor credit worthiness, debtor assets, and property value.

5. The method of claim 4, wherein calculating value further comprises determining ranking scores, funding amounts, statistical analysis, lien dates, and property ages.

6. The method of claim 1, wherein obtaining abatement lien information comprises searching public record databases for abatement lien information.

7. The method of claim 1, wherein determining the value of the lien includes determining a maximum allowable interest charge.

8. The method of claim 1, wherein determining the value of the lien is based at least in part on a probability that the lien will be collected.

9. The method of claim 1, wherein the priority of the lien compared to the other property encumbrances of the property is based at least in part on a comparison of a priority of collection of the lien to a priority of collection of the other property encumbrances of the property.

10. A lien collection system configured to rank a value of liens to determine the enforcement and collectability by prioritizing municipalities, local authorities and agencies abatement liens, the system comprising:
    a memory device configured to store abatement lien information for a lien on a property, wherein abatement lien information comprises property information for the property including information on other property encumbrances associated with the property; and
    a processor operatively coupled to the memory device and configured to obtain abatement lien information and determine a value of the lien based on lien collectability, wherein the value of the lien is based at least in part on a determination of a priority of the lien compared to other property encumbrances of the property, and wherein the value of the lien is further based at least in part on a comparison of the lien to other municipality and agency abatement liens for other properties.

11. The lien collection system of claim 10, wherein the processor is further configured to engage a collection process for the lien, wherein the collection process includes making automatic communications to a debtor, tracking collection efforts, and collecting payments for the lien.

12. The lien collection system of claim 10, wherein the processor is further configured to determine via the processor a purchase value for the lien, wherein the purchase value includes a price at which a buyer purchases the lien.

13. The lien collection system of claim 12, wherein the purchase value is based on a collectability factor and a profit margin for the buyer.

14. The lien collection system of claim 10, wherein determining the value of the lien comprises calculating value based on debtor credit worthiness, debtor assets, and property value.

15. The lien collection system of claim 14, wherein calculating value further comprises determining ranking scores, funding amounts, statistical analysis, lien dates, and property ages.

16. The lien collection system of claim 10, wherein obtaining abatement lien information comprises searching public record databases for abatement lien information.

17. The lien collection system of claim 10, wherein determining the value of the lien includes determining a maximum allowable interest charge.

18. The lien collection system of claim 10, wherein determining the value of the lien is based at least in part on a probability that the lien will be collected.

19. The lien collection system of claim 10, wherein the priority of the lien compared to the other property encumbrances of the property is based at least in part on a comparison of a priority of collection of the lien to a priority of collection of the other property encumbrances of the property.

20. A non-transitory computer-readable medium having computer-readable instructions stored thereon, the computer-readable instructions comprising:
    instructions to obtain abatement lien information for a lien on a property via a computer network, wherein abatement lien information comprises property information for the property including information on other property encumbrances associated with the property;
    instructions to determine via a computer processor a value of the lien based on lien collectability, wherein the value of the lien is based at least in part on a determination of a priority of the lien compared to other property encumbrances of the property, and wherein the value of the lien is further based at least in part on a comparison of the lien to other municipality and agency abatement liens for other properties; and
    instructions to engage a collection process for the lien, wherein the collection process includes making automatic communications to a debtor, tracking collection efforts, and collecting payments for the lien.

* * * * *